United States Patent [19]

Holly

[11] 3,928,891
[45] Dec. 30, 1975

[54] MOLDING APPARATUS
[75] Inventor: Harry H. Holly, Olympia Fields, Ill.
[73] Assignee: Hollymatic Corporation, Park Forest, Ill.
[22] Filed: Apr. 14, 1972
[21] Appl. No.: 244,027

[52] U.S. Cl. .................................. 17/32; 425/251
[51] Int. Cl. .............................................. A22c 7/00
[58] Field of Search ............ 264/328, 17; 17/32, 33; 425/251, 252

[56] References Cited
UNITED STATES PATENTS
| | | | |
|---|---|---|---|
| 1,717,254 | 6/1929 | Polak | 164/313 |
| 2,972,172 | 2/1961 | Federman | 164/313 X |
| 3,347,176 | 10/1967 | Hall | 17/32 |

Primary Examiner—Robert Peshock
Attorney, Agent, or Firm—Hofgren, Wegner, Allen, Stellman & McCord

[57] ABSTRACT

A molding apparatus and method in which pressure flowable moldable material such as ground meat, fish and similar food products are subjected to pressure in a compression chamber for injection through a passage into a shaping cavity such as a meat patty shaped cavity and in which the passage is maintained closed by a pressure movable valve until the pressure on the material becomes sufficient to displace the valve after which the pressurized material is ejected into the mold cavity under sufficient pressure to form a firm molded article. Upon reduction of the pressure on the material in the compression chamber the valve immediately moves back into passage closing position so as to prevent the pressurized material in the mold cavity from flow back through the passage until the mold cavity has been moved out of communication with the passage.

3 Claims, 7 Drawing Figures

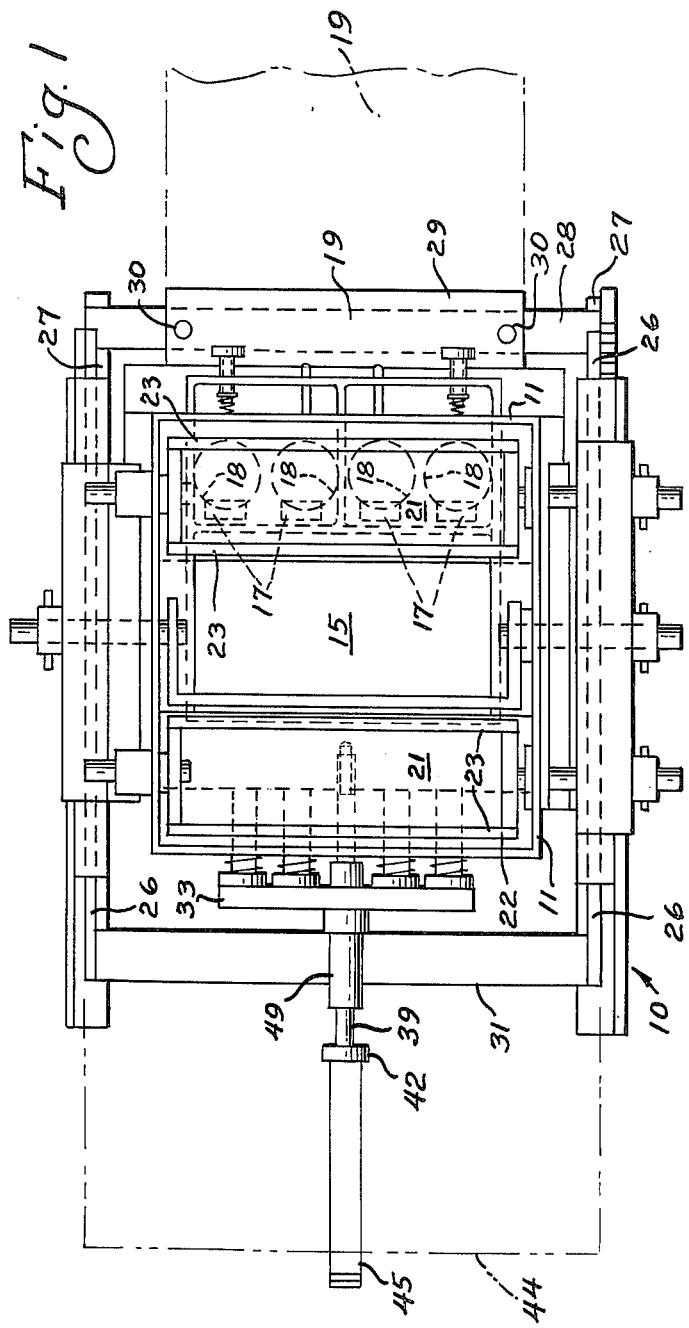
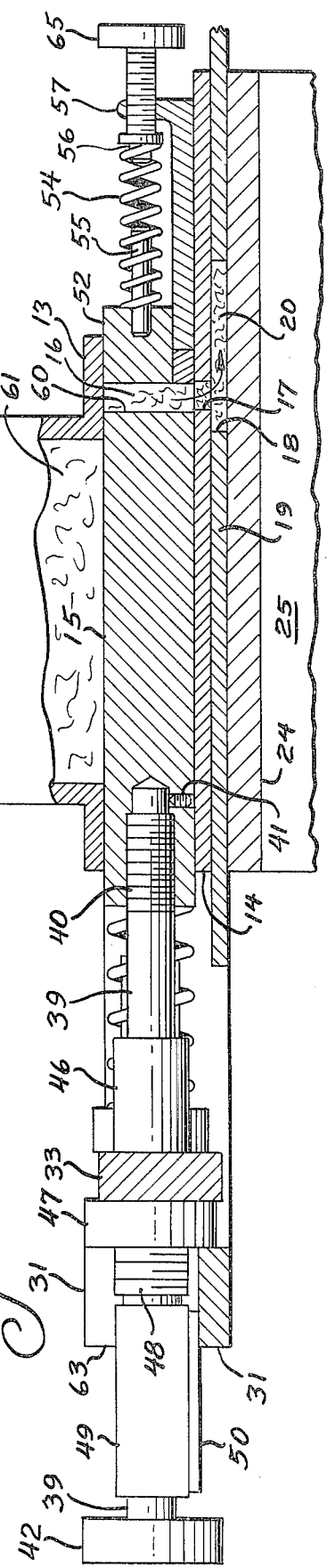

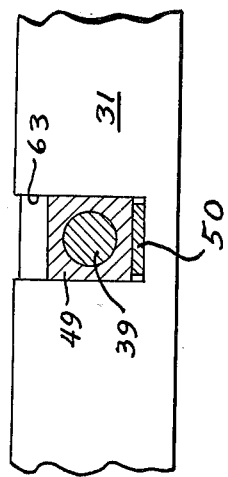
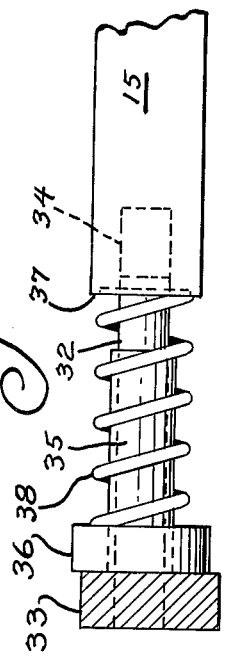
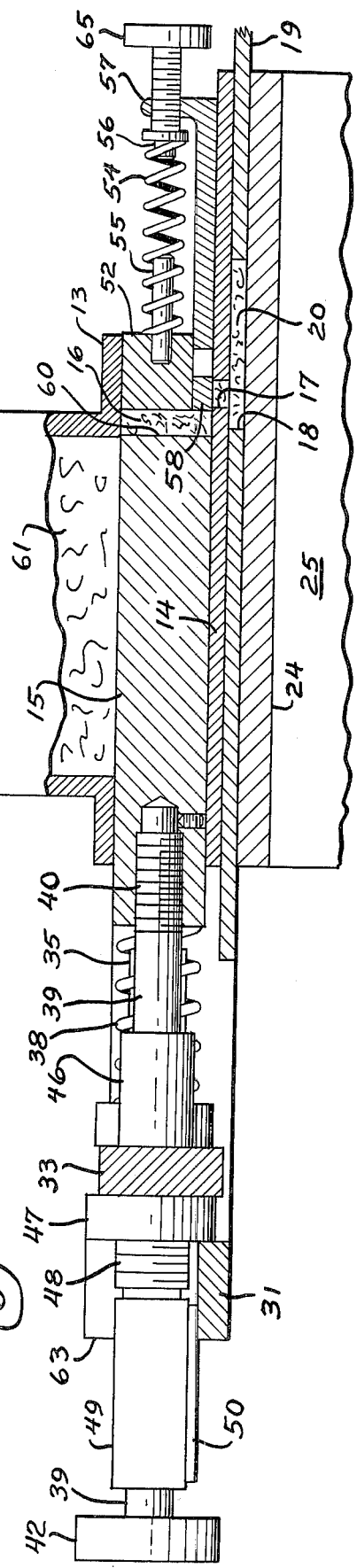

MOLDING APPARATUS

BACKGROUND OF THE INVENTION

This invention relates to the molding of pressure flowable moldable material and particularly ground food material such as ground raw meat, fish and the like in which the material is molded to a desired shape such as a food patty by pressure applied to the material to cause it to flow from a compression chamber which may form an extension of a larger supply means for the material into a mold cavity together with means for opening and closing a passage leading to the cavity dependent upon the pressure applied to the flowable material.

Another feature of the invention is to provide a method of molding a pressure flowable plastic material by applying pressure thereto and using this pressure not only to inject the material into a mold cavity to form a firm article but also to open and close a valve in an access passage leading to the cavity, the result being that pressure on the flowable material opens the valve to permit filling the cavity and initial release of this pressure permits the valve to close so that the molding pressure is maintained on the material in the cavity.

The most pertinent prior art of which applicant is aware is U.S. Pat. No. 3,241,178 which discloses a meat patty forming machine together with a valve, but the valve here is not operated by the pressure on the ground meat itself but by a lever system that is mechanically connected to the motor drive for the machine itself.

BRIEF DESCRIPTION OF THE DRAWINGS

FIG. 1 is a plan view of a molding apparatus embodying the invention.

FIG. 2 is an enlarged fragmentary sectional view taken substantially along line 2—2 of FIG. 1 showing a pressure ram in a forward position and extending into the compression chamber.

FIG. 3 is a view similar to FIG. 2 but showing the pressure ram in its forwardmost position.

FIG. 4 is a fragmentary side elevational view of an enlarged fragmentary detail of the apparatus.

FIG. 5 is a fragmentary sectional view taken substantially along line 5—5 of FIG. 2.

DESCRIPTION OF THE PREFERRED EMBODIMENT

Figure 6:
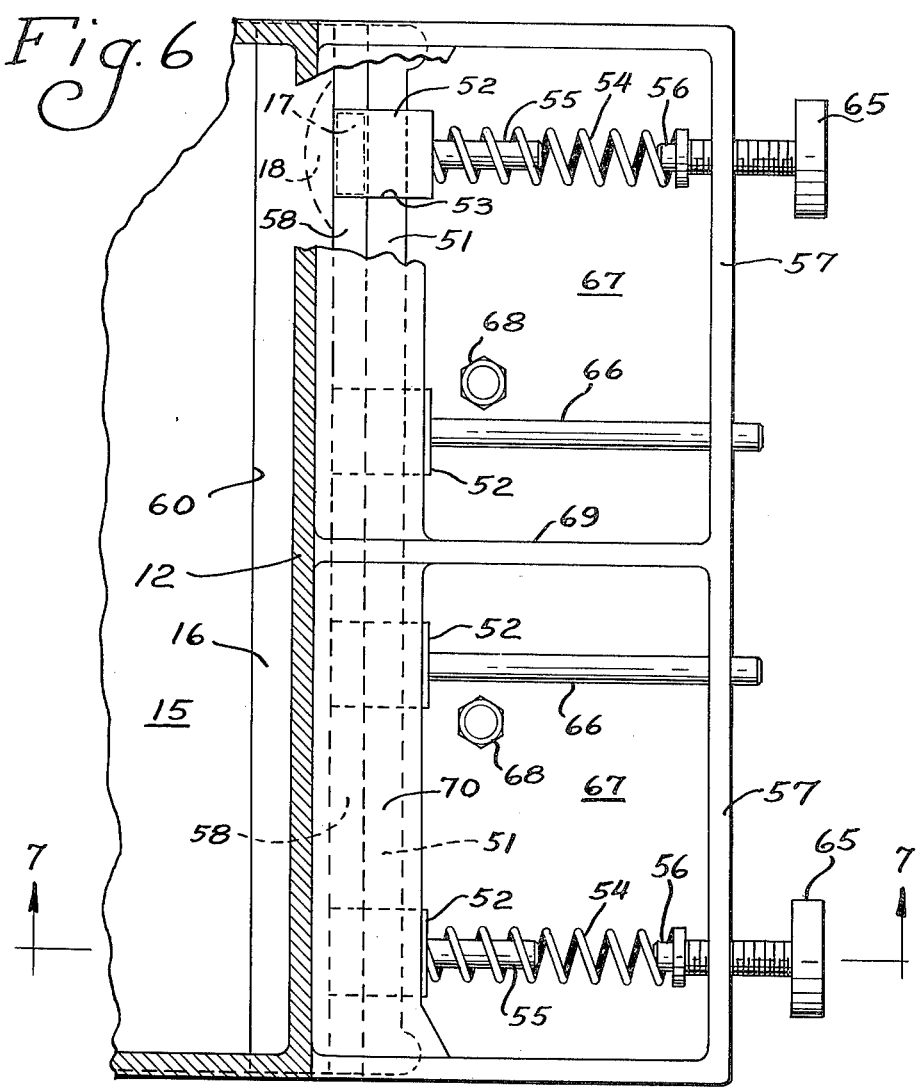
FIG. 6 is a horizontal sectional view taken substantially along line 6—6 of FIG. 3.

In the apparatus illustrated in the accompanying drawings the molding apparatus 10 is provided with a hopper 11 for a moldable material such as ground raw beef and the like with the hopper having a lower section 12 leading downwardly to a compression chamber 13 at the forward end of this lower section 12. The bottom of this section 12 is defined by a bottom plate 14 on which is slidably mounted a pressure means ram 15 that is movable into the compression chamber 13 to apply pressure to the pressure flowable moldable material 16 therein.

This pressure on the material 16 in the compression chamber 13 causes the material 16 to flow through one or more (here shown as four) passage means or fill slots 17 in the bottom plate 14 each into a mold opening or shaping cavity 18 in a reciprocable mold plate 19 to form patties 20 therein.

The device 10 shown in the drawings and described herein is similar to that disclosed in the copending applications of James A. Holly Ser. Nos. 26,814 and 153,376 both assigned to the same assignee as the present application.

The portion of the hopper 11 above the lower section 12 extends upwardly and laterally to provide the spaces 21. Rotatable in each of these spaces is a mover device 22 each having a pair of parallel rods 23 and these devices are rotated in increments to dislodge material on opposite sides of the lower section 12 and move the material so as to be acted upon by the reciprocation of the pressure ram 15. The structure and operation of the mover devices 22 is disclosed in more detail and claimed in the above application Ser. No. 26,814. They are not shown in greater detail here as they form no claimed part of this invention.

The reciprocable pressure ram 15 and the mold plate 19 are reciprocated in opposite directions on opposite sides of the plate 14 with the bottom of the mold plate 19 being supported by a top plate 24 that forms a part of the supporting cabinet 25. In the embodiment illustrated there are four mold openings or shaping cavities 18 arranged across the width of the mold plate 19 and with each having its fill slot 17.

As is explained in the above copending applications the mold plate 19 is moved into and out of communication with the fill slots 17 by apparatus including a top rack 26 on each side of the apparatus with the teeth (not shown) facing downwardly and cooperating bottom racks 27 each parallel to a rack 26 and each with its teeth (not shown) facing upwardly with each pair of racks 26 and 27 engaging a pinion gear (not shown) all as described in the two above copending applications.

The forward ends of the bottom racks 27 are connected by a cross bar 28 to each other and to the forward end 29 of the mold plate 19 by a pair of bolts 30. The rear ends of the top racks 26 are connected together by a horizontal bar 31 that is substantially at right angles to the top racks 26. The reciprocation of the pair of bottom racks 27 moves the mold plate 19 into and out of communication with the fill slots 17. The top racks 26 reciprocate simultaneously in the opposite direction to move the cross bar 31 toward and away from the bottom hopper section 12.

The pressure ram 15 is yieldably and resiliently urged toward the compression chamber 13 end of the apparatus by a structure which includes four bolts 32 each attached to and extending forwardly of a cross bar 33 and slidably received in a recess 34 at the rear of the pressure ram 15. Each bolt 32 slidably engages a cylindrical sleeve 35 that is integral on its outer end (the left end of FIG. 4) with a nut 36 that is adjustably threaded on a bolt 32.

Extending between each nut 36 in the rear 37 of the pressure ram 15 is a helical spring 38 that is concentric to its cooperating bolt 32 and sleeve 35. In the illustrated embodiment as shown in FIG. 1 there are four each of the bolts 32, sleeves 35, nuts 36 and springs 38.

In order to adjust the precompression on each spring 38 and thus the amount of maximum pressure exerted on the material 16 in the compression chamber 13 each nut 36 is threaded to its bolt 32 so that by screwing and unscrewing each nut closer to and further away from the pressure ram 15 the precompression on each spring can be adjusted to the degree desired.

The cross bar 33 at about its midpoint and substantially centrally of two pairs of springs 38 is attached to a shaft 39 whose forward end 40 is attached to the rear of the pressure ram 15 and held therein by a combination of a screw threaded fitting as shown in FIG. 2 and a set screw 41. The shaft 39 extends rearwardly through the midpoint of the cross bar 33 and to a substantial distance therebeyond with the rear of this shaft having attached thereto an enlarged disc 42 which is locked to the shaft as by a set screw 43. The disc 42 operates as a button which is engaged by the rearward movement of the horizontal bar 31 to retract the pressure ram to a rearwardmost position as indicated by the broken line 44 and by the stop 45.

Projecting forwardly of the midpoint of the cross bar 33 is a journal sleeve 46 which serves as a bearing slidable on the shaft 39. Positioned immediately behind the cross bar 33 on the shaft 39 is a drive member 47 that is threadably adjustable longitudinally on the screw threaded end 48 of a bearing block 49. This bearing block which is located in a slot 63 in the bar 31 is elongated with the threaded end 48 being the forward end and with the rear end being just forwardly of the disc 42 that is on the rear of the shaft 39.

As is shown most clearly in FIG. 5 the block 49 is of square cross section and has attached to its bottom surface a thin bearing plate 50. The block also has an axial hole through which extends the shaft 39.

The forward end of the compression chamber 13 is defined by a vertical wall 51 (FIG. 6) in which are located four horizontally movable pistons 52 each of which is slidably mounted in an opening 53 in the wall 51 and is urged to a rearwardmost position by a helical spring 54 whose ends fit over a pair of aligned stub shafts 55 and 56. The one shaft 55 of each pair is attached to the exposed end of a piston 52 while the other shaft 56 is threaded through a supporting bracket 57 so that rotation of each shaft 56 by means of a knurled knob 65 varies the precompression on its spring 54.

Attached to the bottom of all pistons 52 is a closure valve 58 in the form of an elongated strip which normally extends over and simultaneously closes the four fill slot passage means 17 thus blocking access to the shaping cavities 18.

The two pairs of stub shafts 55 and 56 are on the lateral sides of the apparatus as shown in FIG. 6. The other two pistons 52 which are located adjacent the lateral center of the apparatus are each mounted on a guide shaft 66 that extends rearwardly through the bracket 57. Each shaft 66 and its attached piston 52 are guided in a straight line movement by the sliding engagement of the piston 52 in its opening 53 and the sliding engagement of the end of the shaft 66 in the bracket 57.

The bracket 57 is integral with one edge of a base plate 67 which is attached to the top surface of the plate 14 as by a pair of bolts 68.

Located between the pair of guide shafts 66 is a strengthening web 69 which is integral with the base plate 67 and the forward wall of the hopper section 12 and the flange 70 which forms a part of the compression chamber 13 and which also assists in guiding the horizontal movement of the four pistons 52.

The operation of the apparatus embodying the invention is as follows.

As the pressure ram 15 is moved forwardly into the compression chamber 13 as indicated by the arrow 59 the forward end 60 of the ram 15 closes the compression chamber 13 (FIG. 3) to isolate the chamber and the material 16 contained therein from the main supply 61 of material in the hopper 11–12. This isolated material 16 is compressed (FIG. 2) by the advancing pressure ram 15 and the material operates as a hydraulic fluid to apply pressure against the pistons 52 and move them to the right as illustrated against the force of the precompressed springs 54. This movement of the pistons 52 moves the closure valve 58 to which they are attached to expose all fill slots 17 to the high pressure material 16 in the chamber 13.

As soon as the fill slots 17 are thusly exposed the pressure moldable material such as the ground meat which is under heavy pressure immediately flows at high velocity through the fill slots 17 into the mold openings or shaping cavities 18 that now communicate with the fill slots 17.

Figure 7:
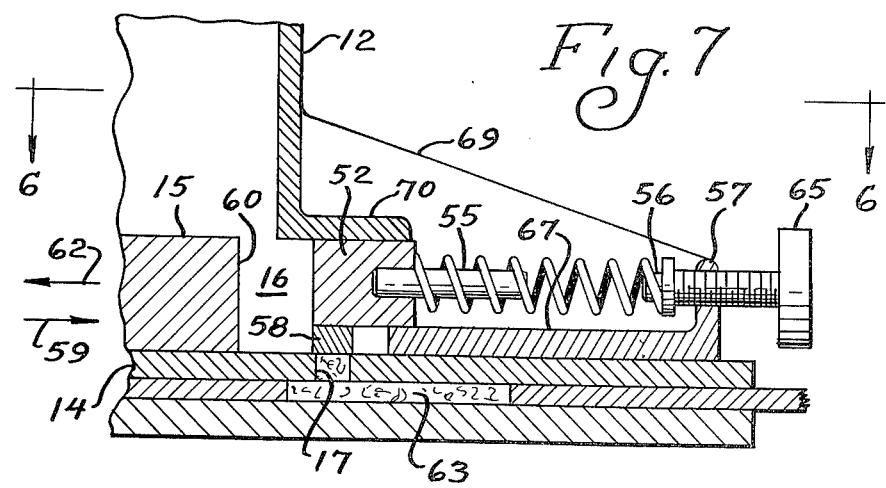
FIG. 7 is a fragmentary vertical sectional view along line 7—7 of FIG. 6.

As soon as the pressure ram 15 starts its rearward movement as illustrated by the arrow 62 the pressure on the material 16 begins to drop and this permits the compressed springs 54 to return the pistons 52 to their normal positions in which the closure valve strip 58 again extends over and closes all fill slots 17. This closing of the valve 58 maintains the material such as the ground meat 63 (FIG. 7) in the mold openings 18 until the openings can be moved forwardly toward ejection position and out of communication with the fill slots 17.

The closure valve 58 which is in the form of an elongated strip attached to the bottom of the pistons 52 comprises a movably mounted surface member that slides on the top surface of the bottom plate 14. In the normal position where there is substantially no pressure on the pistons 52 the springs 54 press them to a location where the valve strip 58 covers the fill slots 17. Although the pressure of the springs 54 is sufficient to hold the valve 58 closed this force on the material 16 is less than the maximum force exerted by the advancing ram 15 in order that the pressure on and through the material 16 isolated in the compression chamber 13 is sufficient to open the valve 58 as described and project the material into the mold openings 18 serving as shaping cavities.

In one embodiment of the invention, the valve strip 58 opened when the ram 15 had exerted about 30% of its maximum pressure on the material 16 which was ground raw beef.

The method of this invention comprises isolating a portion 16 of the pressure flowable moldable material, applying increasing pressure thereto by the advancing ram 15 and utilizing this pressure on the material 16 as a hydraulic force to open the passage fill slots 17 to the shaping cavity openings 18 and force the pressurized material 16 into the cavity openings 18.

Thus with the apparatus and method of this invention there is no requirement for a mechanical drive for the valve 58. The valve is opened automatically by the increasing pressure on the moldable material 16 and is then closed automatically when this pressure is reduced.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. Molding apparatus, comprising: supply means for retaining a supply of pressure flowable moldable material; compression chamber means for said material from said supply; a mold adjacent to said compression chamber means having a shaping cavity therein; passage means communicating between said compression chamber and said cavity for pressure flow of material from said chamber and through said passage into said mold cavity; pressure means for applying pressure to said material in said chamber; a pressure movable piston in said compression chamber; means mounting the piston for movement under increasing pressure transmitted through said material in the compression chamber; and a closure valve mounted on said piston, the piston thereby comprising valve operating means activated by the pressure of said material in the chamber for opening the valve.

2. The apparatus of claim 1 wherein said closure valve comprises a slidable surface member slidably mounted on a portion of said compression chamber means to extend across said passage in passage closing position.

3. Molding apparatus, comprising: supply means for retaining a supply of pressure flowable moldable material; compression chamber means for said material from said supply; a mold adjacent to said compression chamber means having a shaping cavity therein; passage means communicating between said compression chamber and said cavity for pressure flow of material from said chamber and through said passage into said mold cavity; pressure means for applying pressure to said material in said chamber; a pressure movable piston in said compression chamber; means mounting the piston for movement under increasing pressure transmitted through said material in the compression chamber; a closure valve mounted on said piston, the piston thereby comprising valve operating means activated by the pressure of said material in the chamber for opening the valve; yieldable means urging said closure valve toward closed position in opposition to said pressure on the material in said compression chamber with a force that is less than said pressure on said material, said supply being adjacent to said compression chamber to supply material thereto; a reciprocable ram comprising said pressure means cyclically movable toward and away from said passage and into and away from said compression chamber; and means for moving said ram in a path that simultaneously applies said pressure and isolates said compression chamber from said supply means.

* * * * *